United States Patent [19]

Möndel

[11] Patent Number: 5,673,936
[45] Date of Patent: Oct. 7, 1997

[54] DEFLECTOR FITTING FOR SAFETY BELTS

[75] Inventor: Karl Möndel, Schwäbisch Gmünd, Germany

[73] Assignee: TRW Occupant Restraint Systems GmbH, Alfdorf, Germany

[21] Appl. No.: 664,155

[22] Filed: Jun. 14, 1996

[30] Foreign Application Priority Data

Jun. 21, 1995 [DE] Germany .................. 295 10 050 U

[51] Int. Cl.$^6$ .................................................. B60R 22/24
[52] U.S. Cl. .................................... 280/808; 297/483
[58] Field of Search .......................... 280/801.1, 808; 297/468, 483, 486

[56] References Cited

U.S. PATENT DOCUMENTS

| | | | |
|---|---|---|---|
| 4,349,217 | 9/1982 | Fohl | 280/808 |
| 4,369,931 | 1/1983 | Fohl | 280/808 |
| 4,485,985 | 12/1984 | Fohl | 280/806 X |
| 5,415,432 | 5/1995 | Thomas | 280/808 |
| 5,415,433 | 5/1995 | Pfeiffer | 280/808 |

FOREIGN PATENT DOCUMENTS

| | | | |
|---|---|---|---|
| 2383677 | 11/1978 | France | 280/808 |
| 2423235 | 4/1979 | France . | |
| 2174888 | 11/1986 | United Kingdom | 280/808 |

*Primary Examiner*—Christopher P. Ellis
*Attorney, Agent, or Firm*—Tarolli, Sundheim, Covell, Tummino & Szabo

[57] ABSTRACT

A deflector fitting for safety belts comprises a stirrup member which is provided with two parallel limbs. A pin is arranged between the two limbs. On this pin a roller is mounted by means of two bearings which are arranged at axial ends of the roller. The roller is provided with an increased wall thickness between the bearings. This increased wall thickness forms at least one support structure closely spaced from and surrounding the pin.

8 Claims, 3 Drawing Sheets

DEFLECTOR FITTING FOR SAFETY BELTS

TECHNICAL FIELD

The invention relates to a deflector fitting for safety belts.

BACKGROUND OF THE INVENTION

U.S. patent application Ser. No. 08/591,276 of Jan. 25, 1996 is directed to a deflector fitting for safety belts which comprises a stirrup member provided with two parallel limbs, a pin extending between the limbs and a roller mounted on the pin by means of two bearings which are arranged at axial ends of said roller. The bearings utilized are roller bearings. In comparison with deflector fittings involving sliding friction between the roller and the pin such a roller mounted by means of low-friction bearings on the pin leads to lower frictional losses during rotation of the roller in relation to the pin, for which reason the take-up spring of an associated belt retractor may have a lower rating. This increases comfort of the person using the safety belt. In the case of such a deflector fitting however loads occurring even during normal operation when the belt retractor is blocked, for example on sudden braking of the vehicle, may lead to a plastic deformation of the roller or premature wear of its bearings, something which impairs the free running properties of the roller.

BRIEF SUMMARY OF THE INVENTION

The present invention provides a deflector fitting in which plastic deformation of the roller is prevented and bearing loads are reduced so that the free running properties of the roller are maintained over the full operational working life of the deflector fitting.

The deflector fitting according to the invention comprises a stirrup member which is provided with two parallel limbs. A pin is arranged between the two limbs. On this pin a roller is mounted by means of two bearing which are arranged at axial ends of the roller. The roller is provided with an increased wall thickness between the bearings. This increased wall thickness forms at least one support structure closely spaced from and surrounding the pin. Owing to this design, when the roller is under load, as may occur if the belt retractor is blocked, there will only be an elastic deformation of the roller, owing to which the support structure will come into engagement with the pin and will prevent any further deformation of the roller. On the one hand this will prevent any permanent deformation of the roller and on the other hand the low-friction bearings will be relieved, since a part of the load on the roller will be directly transmitted from the support structure to the pin.

In accordance with a preferred embodiment of the invention the roller has a cylindrical shape with an internal diameter which decreases substantially continuously from the bearings towards the support structure. Owing to this design the roller will possess a high resistance to fracture, while furthermore sufficient elastic deformation under load will be possible.

Preferred embodiments of the invention will now be described with reference to the accompanying drawings.

DETAILED DESCRIPTION OF PREFERRED EMBODIMENTS

Figure 1:
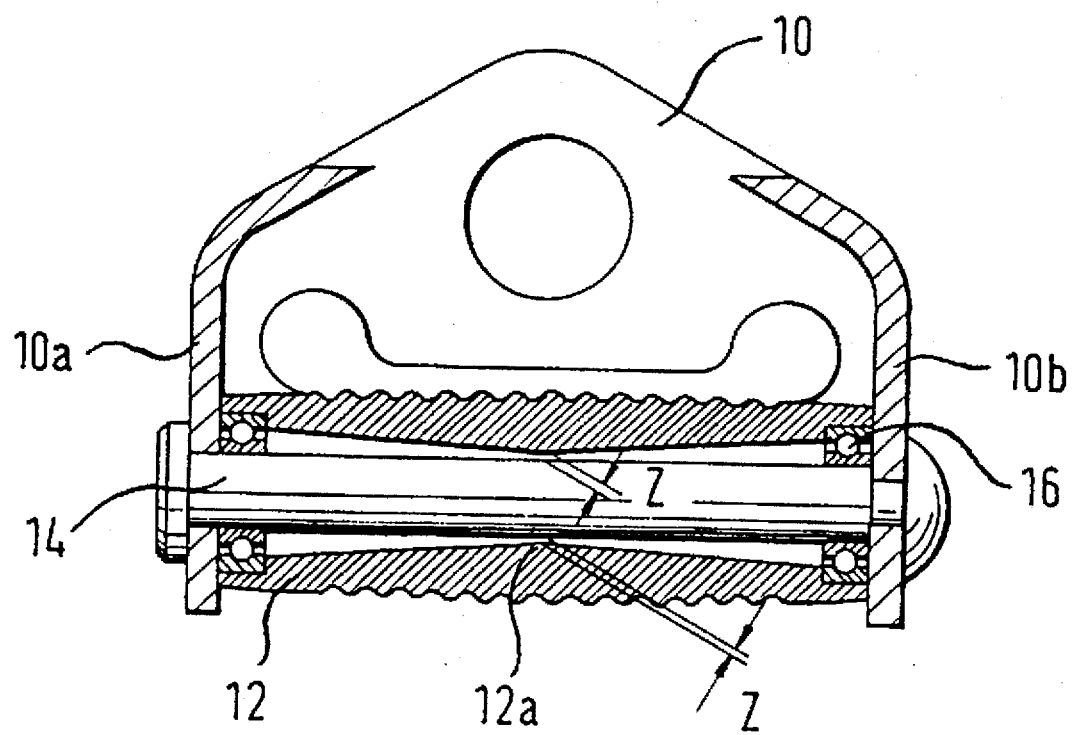
FIG. 1 shows a cross section taken through a deflector fitting in accordance with a first embodiment.

FIG. 1 shows a first embodiment of a deflector fitting 10, which between two parallel limbs 10a and 10b is provided with a roller 12, which is mounted on a pin 14 in a rotatable fashion by means of two low-friction roller bearings 16 provided at the axial ends of the roller. The internal diameter of the roller 12 decreases from the position of the bearings 16 towards a support structure 12a continuously so that in the middle between the two bearings 16 the internal diameter of the roller 12 is only slightly greater than the external diameter of the pin 14.

The function of this design is as follows: as long as the belt webbing runs freely over the deflector fitting, i.e. when the belt retractor is not blocked and the force in the belt webbing is only caused by the wind-up spring of the belt retractor, it is possible for the roller to turn freely on the low-friction bearings 16, since owing to the distance Z between the support structure 12a and the external surface of the pin 14 no additional friction will occur. When the belt retractor is blocked and the belt webbing is subject to forces which are substantially larger than the forces in the case of a belt retractor which is not blocked, the force transmitted to the roller 12 upon deflection of the belt webbing will lead to an elastic deformation of the roller, by which the roller 12 will, owing to the support structure 12a, lie against the pin 14. Accordingly a part of the load acting on the roller will be directly transmitted to the pin via the support structure 12a, and merely the remaining part of the load will be transmitted to the pin via the low-friction bearings 16.

This design possesses the following advantages: since the roller bearings 16 are loaded less than is the case with a conventional deflector fitting, the length of life of the bearings 16 will be longer than is the case with a conventional deflector fitting, for which reason the free running properties of the bearings of the roller will be maintained throughout the entire working life of the roller. Owing to the lower load on the bearings same may in some cases be designed with a lower load carrying capacity than in a conventional deflector fitting with the result that the free running properties of the roller 12 will be further increased. Despite the lower load carrying capacity of the bearings same will have a longer working life, since when the roller is under a high load a part of the load will be directly transmitted to the pin bypassing the low-friction bearings. A special advantage of this design of the roller is that the direct support of the roller by means of the support structure 12a on the pin 14 only takes effect when the belt retractor is already blocked and essentially no further movement of the belt webbing in relation to the deflector fitting is taking place. If on the contrary the belt retractor is not blocked and a movement of the belt webbing in relation to the deflector fitting is possible, the roller will exclusively ride on the pin via the low-friction bearings, and the support structure will not impair the free running of the roller. Finally, a further advantage of the design is that owing to the continuous increase in the wall thickness of the roller towards the middle thereof the resistance to fracture of the roller is particularly high, while simultaneously elastic displacement of the roller under high load will be possible. A plastic deformation, which would be disadvantageous for the free running properties of the roller, is prevented because when the roller is under load the support structure will come into engagement with the pin.

Figure 2:
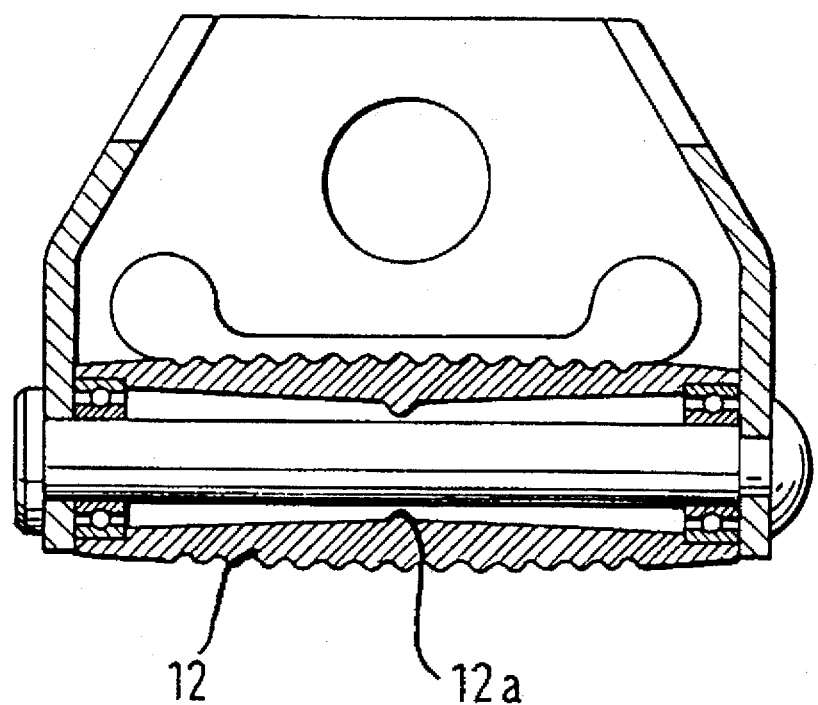
FIG. 2 shows a cross section taken through a deflector fitting in accordance with a second embodiment.

FIG. 2 shows a second embodiment of the deflector fitting in accordance with the invention. The difference between the second and the first embodiment is that the wall thickness of the roller 12 is substantially constant with the exception of the support structure. The roller 12 is generally in the form of a sleeve. In the middle between the low-friction bearings owing to an increased wall thickness an inwardly directed support structure 12a is formed, which in the case of this embodiment assumes the form of an annular bead. The internal diameter of the support structure is slightly larger than the external diameter of the pin in this embodiment as well.

The roller performs the same function as the roller of the deflector fitting in accordance with the first embodiment. The support structure may come into abutment with the pin with the result that a part of the load acting on the roller is directly transmitted to the pin and excessive deformation of the roller is precluded. The advantage of this design of the roller over that of the first embodiment resides in a saving of material for the production of the roller.

In the embodiments illustrated in the figure the axial ends of the roller are extended past the low-friction bearings so that together with the liras of the deflector fitting they constitute a seal with a narrow gap. This prevents the access of dust and dirt into the interior of the roller and therefore of the low-friction bearings, something which ensures satisfactory operation of the low-friction bearings over a long period of time. For a further improvement of the free running properties it is possible to employ sealed low-friction bearings, in the case of which the influence of dust and dirt from the surroundings of the free running properties is further reduced.

In the case of both embodiments of the deflector fitting illustrated the roller is provided with peripherally directed grooves on its outer peripheral surface so that the external form of the roller will when viewed in cross section have a corrugated configuration. Since during use of the safety belt the belt does not run perpendicularly to the longitudinal axis of the roller but rather obliquely to same, the belt webbing will tend to move out of place in the one or the other direction on the roller dependent on the direction of movement of the belt webbing. Accordingly it is possible for the belt webbing to run up against stationary parts of the deflector fitting, something which will impair free running of the belt webbing. Owing to grooves formed on the outer periphery of the roller the tendency of the belt webbing to move out of position will be reduced, something which also leads to free running of the belt webbing on the roller.

Figure 3:
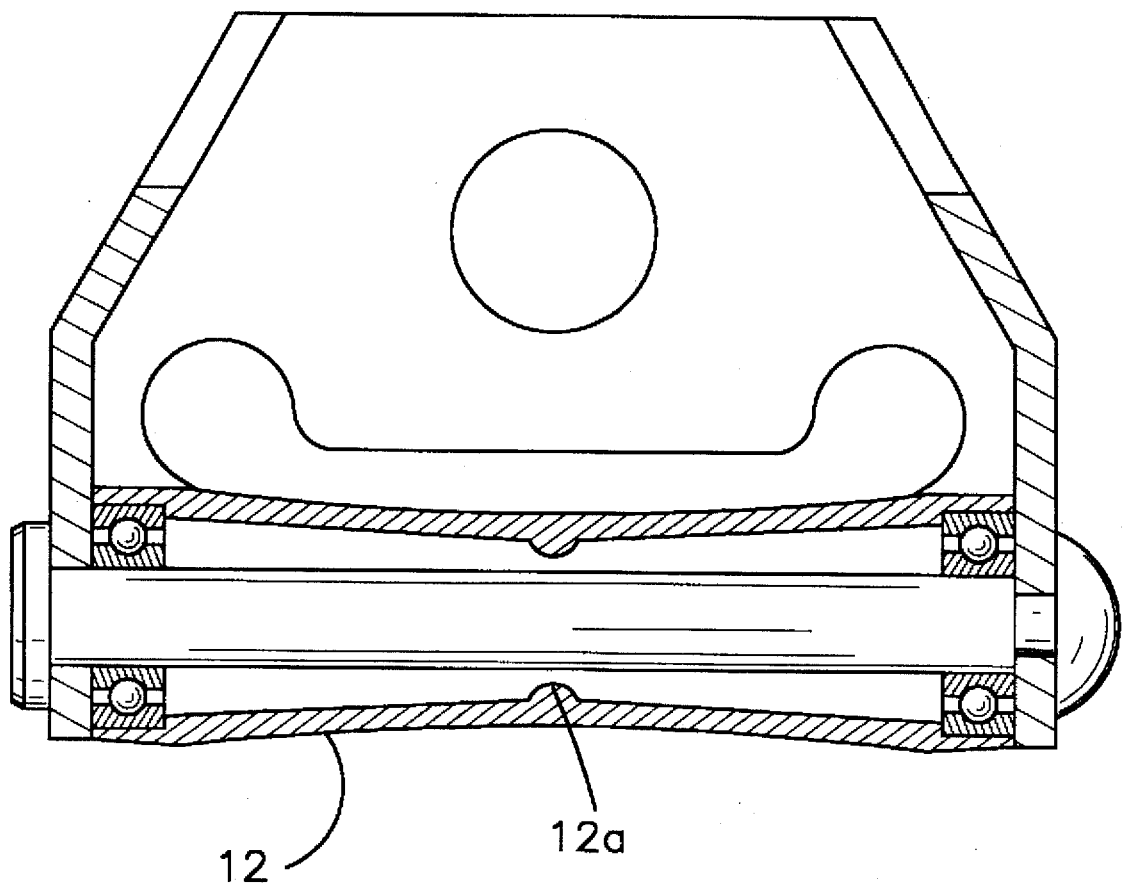
FIG. 3 shows a cross section taken though a different version of the deflector fitting shown in FIG. 2.

The tendency of the belt webbing to move out of place on the roller 12 can also be reduced by a configuration of the outer peripheral surface of the roller 12 as shown in FIG. 3. FIG. 3 shows a different version of the embodiment of the deflector fitting shown in FIG. 2, the outer peripheral surface of the roller being formed when, viewed in a cross section, concave. In an alternative configuration the outer peripheral surface of the roller may be formed, viewed in a cross section, convex.

We claim:

1. A deflector fitting for safety belts, comprising a stirrup member provided with two parallel limbs, a pin extending between said limbs, and a roller mounted on said pin by means of two bearings which are arranged at axial ends of said roller, said roller having an increased wall thickness between said bearings, forming at least one support structure closely spaced from and surrounding said pin.

2. The deflector fitting of claim 1, wherein said bearing is a roller bearing.

3. The deflector fitting of claim 1, wherein said roller has a cylindrical shape with an internal diameter which decreases substantially continuously from said bearings towards said support structure.

4. The deflector fitting of claim 1, wherein said support structure is constituted by at least one annular bead directed inwardly from said sleeve-like roller.

5. The deflector fitting of claim 1, wherein said roller is provided with grooves formed in the outer peripheral surface of the roller and extending in the peripheral direction.

6. The deflector fitting of claim 1, wherein said roller is provided with an outer peripheral surface which, when viewed in a longitudinal cross section, is concave.

7. The deflector fitting of claim 1, wherein said roller is provided with an outer peripheral surface which, when viewed in a longitudinal cross section, is convex.

8. The deflector fitting of claim 1, wherein the axial ends of said roller project over said bearings so that together with said limbs a seal with a narrow gap is formed.

* * * * *